2,942,032
PREPARATION OF ETHINYL SULFIDES AND 1,2-BIS(ORGANOTHIO)ETHYLENES

David Y. Curtin, Urbana, Ill., and Guy C. Murdoch, Wycombe, Pa., assignors to Rohm & Haas Company, Philadelphia, Pa., a corporation of Delaware No Drawing. Filed Sept. 5, 1958, Ser. No. 759,143

9 Claims. (Cl. 260—609)

This invention relates to the preparation of ethinyl sulfides and 1,2-bis(organothio)ethylenes.

Broadly stated, the object of this invention is to provide an economical and practical process for preparing ethinyl sulfides and 1,2-bis(organothio)ethylenes. Another object is to provide such a method whereby the desired end products are obtained by the use of disulfides as the starting material.

Additional objects will become apparent from the following description and claims.

The foregoing and other objects are accomplished by the present invention which broadly comprises the reaction of sodium or potassium acetylide with any organo disulfide (i.e., any disulfide having an organic radical such as an alkyl, aryl, aralkyl, heterocyclic, etc.). The reaction takes the following forms:

$$HC \equiv CM + RSSR \longrightarrow RSC \equiv CH + RSM$$

$$CH \equiv CM + RSSR \longrightarrow RSCH = CMSR \xrightarrow{H_2O} RSCH = CHSR + MOH$$

where M is sodium or potassium and R is any organic radical stable with respect to strong bases. It is also possible to use a monosubstituted acetylene, this leading to the formation of the correspondingly substituted ethinyl sulfide as in the following equation:

$$R'C \equiv CM + RSSR \rightarrow RSC \equiv CR' + RSM$$

where M and R are as stated above, and R' is any organic radical stable with respect to strong bases.

To those familiar with the art, the advantages of the above-indicated processes will be immediately apparent. Some of the disadvantages heretofore experienced will be evident from the following description of techniques which the present invention has made obsolete.

One way of preparing ethinyl sulfides was to eliminate two molecules of hydrogen halide from 1,2-di(halo)ethyl sulfides in the following manner:

$$RSCHXCH_2X \xrightarrow{\text{base}} RSCH = CHX \xrightarrow{\text{base}} RSC \equiv CH$$

This method has been of limited use because of the lack of availability of the starting materials. The dihaloethyl sulfides are most readily obtained by halogenation of vinyl sulfides, but considerable difficulty is involved with this process, as the vinyl sulfides are not readily available. The dichloroethyl sulfides are very unpleasant materials to handle, being lachrymators and vesicants. In addition, the first step in the dehydrohalogenation leads to a mixture of the cis and trans chlorovinyl sulfides, but only the cis compound dehydrohalogenates smoothly to the ethinyl sulfide.

Ethinyl sulfides have also been made by the elimination of mercaptan from 1,2-bis(organothio)ethylenes. Here, too, the starting materials have not been readily obtainable in the past, although they may now be obtained readily enough by the process of the present invention. By contrast, the novel methods herein disclosed make use of starting materials which are abundantly available. Organic disulfides can be obtained in large volume by the oxidation of the corresponding mercaptans. Acetylene and sodium metal, used to prepare sodium acetylide, are produced in large volume. Thus, we provide a practical method for the commercial production of these compounds.

In practicing this invention, the alkali metal acetylide is first prepared by any of the methods well known to the art. The disulfide is then reacted with the acetylide. If the acetylide is prepared in liquid ammonia, it is desirable to add an organic solvent to displace the ammonia in order to complete the reaction at a higher temperature. The reaction mixture is heated at a temperature of 40° C. to 100° C. in order to complete the reaction, cooled and hydrolyzed with water, and the product is recovered by conventional methods such as fractional distillation.

The following examples illustrate the practice of this invention. They are, of course, merely illustrative and should not be deemed to be limitations of the invention, as many modifications thereof may be made without departing from its broad spirit and scope.

Example 1

Anhydrous ammonia (300 ml.) was distilled from freshly prepared sodamide under nitrogen into a cooled, 3-neck reaction flask equipped with a stirrer, gas inlet, thermometer, and sodium hydroxide scrubber-vent. Dry acetylene was introduced below the surface of the ammonia until saturation was achieved. Metallic sodium (7.5 grams, 0.326 mole) was added in small pieces while the acetylene flow was continued. This was done for about 45 minutes and resulted in the formation of sodium acetylide. The reaction mixture was cooled to $-40°$ C. by a Dry Ice-acetone bath and was protected from atmospheric moisture and carbon dioxide by scrubbers containing caustic pellets. When the preparation of the sodium acetylide was completed, the flask was flushed with dry nitrogen. Immediately thereafter n-butyl disulfide (29.0 grams, 0.163 mole) was added rather quickly from a dropping funnel to the ammonia and sodium acetylide at about $-35°$ C. Benzene (92.5 grams) was added and the ammonia was removed by distillation for about one hour.

The resulting slurry was heated to 60° C. for 12 hours, then added to cracked ice. When the gas evolution from unreacted sodium acetylide ceased, the oil was separated, washed with water and finally with dilute ammonium chloride. The washed oil was fractionated and n-butyl ethinylsulfide (4.5 grams, 0.0396 mole) representing 24 percent yield, from disulfide, was obtained in one fraction. The boiling point of this fraction was 38°–45° C./16 mm. Hg, with an index of refraction ($n_D^{25}$) of 1.4710. A second major fraction, 1,2-bis(n-butylthio)ethylene (7.0 grams, 0.0344 mole), was isolated in 22 percent yield, based on the disulfide. This fraction had a boiling point of 94°–100° C./0.75 mm. Hg, and an index of refraction ($n_D^{25}$) of 1.5278. Elemental analysis of the ethinyl sulfide was in good agreement with the theoretical values as follows: Percent carbon (theo.) 63.10, (exptl.) 63.16; percent hydrogen (theo.) 8.83, (exptl.) 8.87; sulfur (theo.) 28.07, (exptl.) 27.82.

Example 2

Following the method of Example 1, except that methyl disulfide is employed as the reagent, ethinyl methyl sulfide is prepared. This product has a boiling point of 69°–71° C./atm., and an index of refraction ($n_D^{25}$) of 1.4819. Elemental analysis compared with theoretical values are as follows: Percent carbon (theo.) 49.96, (exptl.) 50.15; percent hydrogen (theo.) 5.51, (exptl.) 5.89; percent sulfur (theo.) 44.45, (exptl.) 43.82. The yield of the ethinyl sulfide is 16 percent, and the yield of 1,2-bis(methylthio)ethylene is 51 percent, based on disulfide.

Example 3

In the same manner as described in Example 1, ethinyl n-octyl sulfide B.P. 79° C./4 mm. Hg, is prepared, using n-octyl disulfide and sodium acetylide as the reactants.

Example 4

Also following the procedure set forth in Example 1, ethinyl phenyl sulfide is prepared, using phenyl disulfide and potassium acetylide as the reactants. The product has a boiling point of 90° C. /14 mm. Hg, and an index of refraction ($n_D^{25}$) of 1.593.

Example 5

The same procedure is followed as in Example 4 in a number of additional experiments, except that instead of using phenyl disulfide, other disulfides are used in which the phenyl radical is substituted with a lower alkyl radical such as p-tolyl disulfide.

Example 6

The same procedure is followed as in Example 4 in a number of additional experiments except that, instead of using phenyl disulfide, a disulfide with an aralkyl radical, such as benzyl disulfide, may be successfully employed.

The foregoing examples serve to illustrate the broad principles of the invention. It should be obvious that the starting materials, the various reaction conditions such as temperature, time, etc., can be varied considerably within the scope of the invention. For example, any disulfide whose R groups are stable to strong base will work satisfactorily. Preferably, a lower alkyl sulfide, i.e., one whose carbon atoms range from 1 to 10, or a phenyl disulfide should be employed. As indicated, either the sodium or potassium acetylide would be suitable as well as most economical.

The products of the present invention have desirable herbicidal properties, and also constitute chemical intermediates from which a variety of compounds having marked biochemical activity can be made. For example, in a standard post-emergence herbicide test, ethinyl-n-butyl sulfide, made pursuant to the process of subject invention, gave 80 percent kill of millet and 50 percent kill of dock at an application rate of 10 pounds per acre. This test consists of planting crop and weed seeds in soil in flats, allowing the seeds to germinate and the seedlings to develop, and treating the resulting plants with a spray or dust about two weeks after the seeds are planted. About two weeks later, the state of growth and the phytotoxic effects are evaluated. Sprays are applied usually at a standard carrier rate of 50 gallons per acre and the concentration of herbicidal agent varied to supply it at the desired rate; e.g., 1, 2, 3, 5, or 10 pounds per acre.

Since it is apparent that this invention is employable in embodiments of varying scope, it will be obvious that it has wide application. We therefore choose not to limit ourselves to the specific embodiments herein disclosed except as they have been defined in the appended claims.

We claim:

1. A process for preparing an ethinyl sulfide having the structure RSC≡CH and a 1,2-bis(organothio)ethylene having the structure

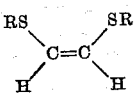

which comprises reacting an alkali metal acetylide with an organodisulfide having the structure RSSR, R in each instance being a member of the group consisting of a lower alkyl radical having up to 10 carbon atoms, benzyl, phenyl and lower alkyl substituted phenyl radicals and the reaction being carried out above room temperature but at a temperature not over about 100° C., then recovering the ethinyl sulfide and the organothioethylene from the reaction product.

2. The process of claim 1 in which the acetylide is a member of the class consisting of sodium and potassium acetylides.

3. The process of claim 1 in which the ethinyl sulfide prepared is n-butyl ethinyl sulfide, the disulfide employed in the reaction being n-butyl disulfide.

4. The process of claim 1 in which methyl disulfide is employed as the reactant with the acetylide, and methyl ethinyl sulfide is produced.

5. The process of claim 1 in which n-octyl disulfide is employed as the reactant with the acetylide, and n-octyl ethinyl sulfide is produced.

6. The process of claim 1 in which phenyl disulfide is employed as the reactant with the acetylide, and phenyl ethinyl sulfide is produced.

7. The process of claim 1 in which a lower alkyl substituted phenyl disulfide is employed as the reactant with the acetylide, and the corresponding substituted phenyl ethinyl sulfide is produced.

8. The process of claim 1 in which the alkali metal acetylide employed is one which was prepared in liquid ammonia, there being added to the reaction an organic solvent capable of displacing the ammonia followed by a distillation step in which the ammonia is removed, the resulting slurry thereafter being heated at a temperature of from about 40° to about 100° C. to form the ethinyl sulfide and the organothioethylene.

9. The process of claim 8 in which the organic solvent is benzene.

No references cited.